United States Patent [19]
Shieh

[11] Patent Number: 5,530,427
[45] Date of Patent: Jun. 25, 1996

[54] ALARM LOCK

[76] Inventor: Jin-Ren Shieh, No. 178, Shih Chia Rd., Taichung, Taiwan

[21] Appl. No.: 346,175

[22] Filed: Nov. 22, 1994

[51] Int. Cl.$^6$ ................................................. B60R 25/00
[52] U.S. Cl. ......................... 340/542; 70/226; 70/228; 70/233; 133/69
[58] Field of Search ........................... 340/542; 188/69, 188/31; 70/225, 226, 227, 233, 260, 185, 161, 33, 228

[56]             References Cited
          U.S. PATENT DOCUMENTS

| | | | |
|---|---|---|---|
| 4,294,090 | 10/1981 | Metzger | 188/37 |
| 4,571,965 | 2/1986 | LeRoux | 70/227 |
| 4,690,252 | 9/1987 | Kottke | 188/69 |
| 4,912,456 | 3/1990 | Mickel | 340/542 |
| 4,983,948 | 1/1991 | Sunami | 340/542 |
| 5,265,451 | 11/1993 | Phifer | 70/226 |
| 5,266,923 | 11/1993 | Tseng | 340/542 |
| 5,365,758 | 11/1994 | Shieh | 70/226 |
| 5,379,618 | 1/1995 | Shieh | 70/227 |
| 5,388,436 | 2/1995 | Shieh | 188/69 |

*Primary Examiner*—Brent A. Swarthout
*Assistant Examiner*—Albert K. Wong
*Attorney, Agent, or Firm*—Browdy and Neimark

[57]              ABSTRACT

An alarm lock comprises an alarm wiring and a locking apparatus in which the alarm wiring is disposed. The alarm wiring is composed of a microswitch, a first battery charger, a second battery charger, a triggering circuit, a comparing circuit, an oscillating circuit, and a loud speaker. The locking apparatus is made up of a main body, a lock core, an alarm device, and a connection member. The main body is intended to receive therein a motorcycle disk brake. The lock core has a body mounted slidably in the main body, a lock bolt driven by the body, a retaining member and a retaining portion for locating the lock core, and a driving portion disposed on the lock bolt. The alarm device is housed in the main body. The connection member is disposed in the main body such that the connection member is located between the driving portion and the alarm device, and that the connection member can be actuated by the driving portion to start or shut off the alarm device.

10 Claims, 2 Drawing Sheets

ALARM LOCK

FIELD OF THE INVENTION

The present invention relates generally to a lock for use in the vehicle, and more particularly to a locking device having an alarming effect.

BACKGROUND OF THE INVENTION

In general, the method of preventing the theft of a vehicle comprises the use of an electrically-operated alarming device or a key-operated locking device. The electrically-operated alarming device is rather effective in providing the theft prevention; nevertheless it is rather vulnerable to a sabotage in view of the fact that it is not protected by a strong and rigid housing. The key-operated locking device is well protected by a strong and rigid housing and is, however, limited in design in that it is not provided with a sound alarm or a luminous alarm.

SUMMARY OF THE INVENTION

It is therefore the primary objective of the present invention to provide an alarm lock which has a combination of advantages of both the electrically-operated alarming device and the key-operated locking device.

It is another objective of the present invention to provide an alarm lock with an alarming device capable of being activated when the alarm lock is unlocked.

In keeping with the principle of the present invention, the foregoing objectives of the present invention are attained by an alarm lock, which comprises an alarm wiring and a locking apparatus in which the alarm wiring is disposed. The alarm wiring is composed of a microswitch, a first battery charger, a second battery charger, a triggering circuit, a comparing circuit, an oscillating circuit, and a speaker. The locking apparatus is made up of a main body, a lock core, an alarm device, and a connection member. The main body is intended to receive therein a disk brake of the motorcycle. The lock core has a body mounted slidably in the main body, a lock bolt driven by the body, a retaining member and a retaining portion for locating the lock core, and a driving portion disposed on the lock bolt. The alarm device is housed in the main body. The connection member is disposed in the main body such that the connection member is located between the driving portion and the alarm device, and that the connection member can be actuated by the driving portion to start or shut off the alarm device.

DETAILED DESCRIPTION OF THE INVENTION

Figure 1:
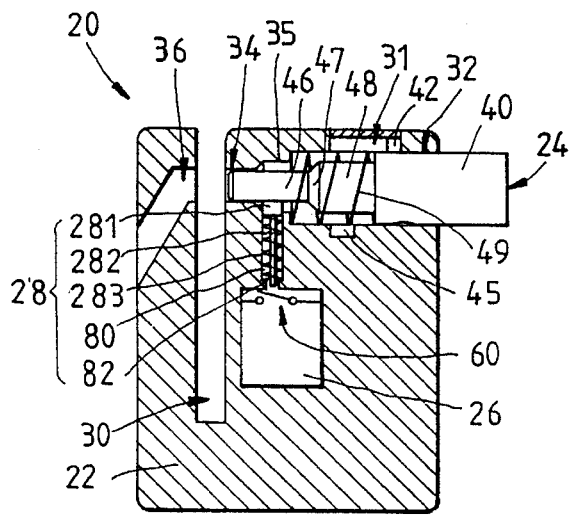
FIG. 1 is a sectional view of a first preferred embodiment of the present invention in which the lock core is located at a first position.
Figure 2:
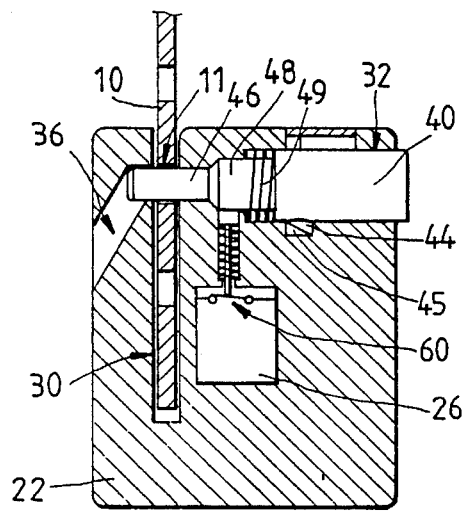
FIG. 2 is another sectional view of the first preferred embodiment of the present invention in which the lock core is located at a second position.

As shown in FIGS. 1 and 2, a locking apparatus 20 of the present invention is intended to incapacitate a motorcycle disk brake 10 and is composed of a main body 22, a first lock core 24, an alarm device 26, and a connection member 28.

The main body 22 is provided with a slot 30 of appropriate width and depth and extending downwards from the top thereof, a first axial hole 32 of an appropriate length and extending leftwards from the right side thereof, a second axial hole 34 extending rightwards from the right side of the slot 30 and communicating with the first axial hole 32 which has an inner diameter greater than an inner diameter of the second axial hole 34, a stepped portion 35 located between the first and the second axial holes 32 and 34, and a retaining hole 36 extending leftwards from the inner wall of the left side of the slot 30 and then extending downwards and obliquely to pass through the outer side of the main body 22. The first axial hole 32 is provided in the inner wall thereof with a guide slot 31 of an appropriate length and extending along the direction of the axis of the first axial hole 32.

The first lock core 24 has a first body portion 40 disposed slidably in the first axial hole 32, a locating pin 42 fastened to the first body portion 40 and extended to remain in the guide slot 31, a first retaining member 44 disposed under the first body portion 40 such that the first retaining member 44 can be driven to move upwards and downwards, a first retaining portion 45 disposed under the inner wall of the first axial hole 32 such that the first retaining portion 45 is corresponding in location to the first retaining member 44, and a first lock bolt 46 disposed on the left side of the first body portion 40 such that the first lock bolt 46 can be caused to move leftwards and rightwards between the first axial hole 32, the second axial hole 34 and the retaining hole 36. The first lock bolt 46 is provided with a first driving portion 48 which is disposed in the first axial hole 32. The first driving portion 48 is of a rod-shaped construction and is located between the first body portion 40 and the first lock bolt 46. The first driving portion 48 has an outer diameter greater than the outer diameter of the first lock bolt 46 and is provided with a slanted guiding surface 47. The first lock core 24 further has a first retrieving spring 49, which is fitted over the first lock bolt 46 such that both ends of the retrieving spring 49 urge the stepped portion 35 and the first body portion 40.

Figure 6:
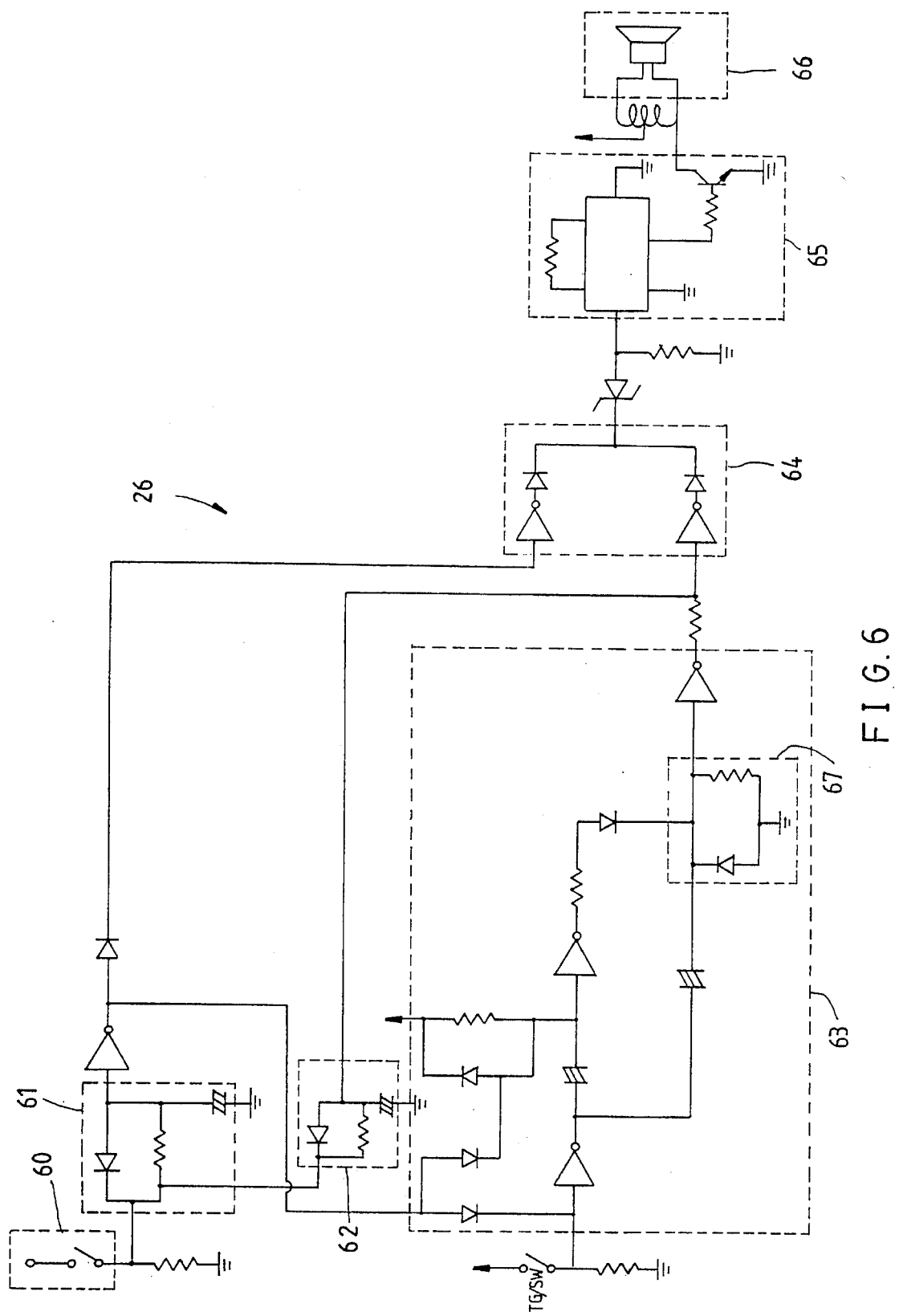
FIG. 6 shows a schematic view of the wiring of the alarm device used in the first and the second preferred embodiments of the present invention.

As shown in FIG. 6, the alarm device 26 is provided with a microswitch 60, a first battery charger 61, a second battery charger 62, a triggering circuit 63, a comparing circuit 64, an oscillating circuit 65, and a loud speaker 66. When the microswitch 60 is turned on, the first and the second battery chargers 61 and 62 are activated. As the first battery charger 61 is activated, a mercury switch (TG/SW) of the triggering switch 63 is actuated, thereby causing the triggering circuit 63 and the first battery charger 61 to transmit a signal to the comparing circuit 64, which in turn transmits a signal to actuate the speaker 66 via the oscillating circuit 65. The triggering circuit 63 comprises a delay circuit 67 which is activated at the same time when the microswitch 60 is turned on, so as to cause the mercury switch to become active in ten seconds after the microswitch 60 is turned on. As a result, the alarm device 26 and the speaker 66 are not activated simultaneously by design.

The connection member 28 is disposed in a third axial hole 80 of the main body 22. The third axial hole 80 is located between the retaining hole 36 and the stepped portion 35 such that the third axial hole 80 is extended vertically and downwards from the inner wall of the first axial hole 32. The third axial hole 80 is provided with a protuberance 82 located at the bottom thereof. The alarm device 26 is disposed at the end of the third axial hole 80 such that the microswitch 60 is in communication with the bottom of the third axial hole 80. The connection member 28 is provided with a head end 281 and a tail end 282 smaller in outer diameter than the head end 281. A coil spring 283 is fitted over the tail end 282 such that both ends of the coil spring 283 urge respectively the head end 281 and the protuberance 82, with the head end 281 being forced out of the third axial hole 80 to extend into the first axial hole 32 to press against the periphery of the first lock bolt 46.

In operation, the motorcycle disk brake 10 is disposed in the slot 30 before the first lock core 24 is moved from the first position on the left to the second position on the right in cooperation with the locating pin 42 and the guiding slot 31. The first retaining member 44 is therefore inserted into the first retaining portion 45. In the meantime, the first lock bolt 46, which is actuated by the second body portion 40, is caused to move leftwards to enter the retaining hole 36 via the heat radiating hole 11 of the motorcycle disk brake 10, thereby disabling the motorcycle disk brake 10. When the first lock bolt 46 is caused to move to the left, the portion of the first lock bolt 46, which is urged by the head end 281 of the connection member 28, is caused to press against the first driving portion 48 via the guiding surface 47. The connection member 28 is thus forced to move downwards in view of the fact that the first driving portion 48 has a greater outer diameter. As a result, the microswitch 60 is triggered by the tail end 282 of the connection member 28 so that the alarm device 26 is activated.

Figure 5:
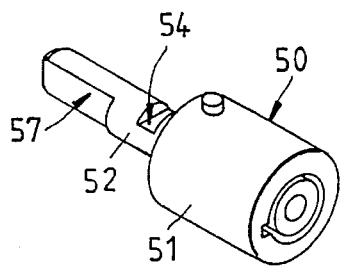
FIG. 5 shows a perspective view of the lock core of the second preferred embodiment of the present invention.
Figure 3:
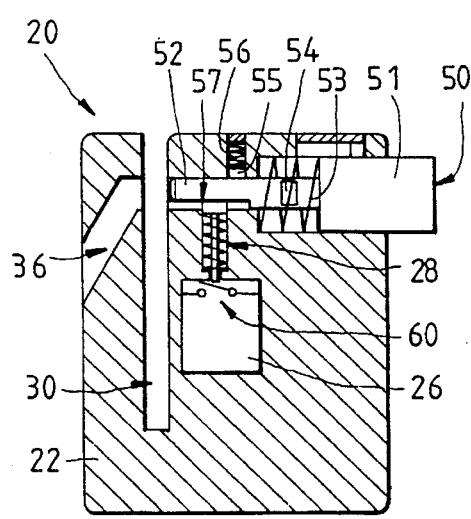
FIG. 3 is a sectional view of a second preferred embodiment of the present invention in which the lock core is located at a first position.
Figure 4:
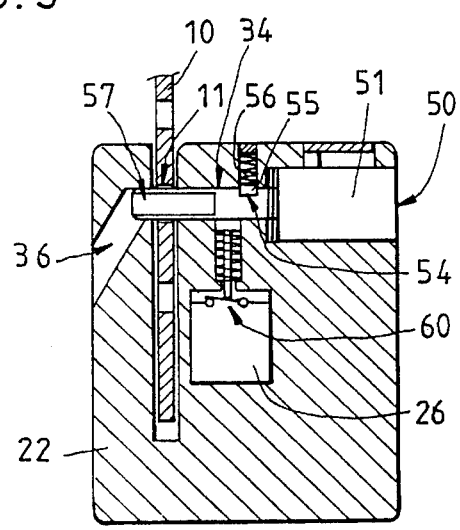
FIG. 4 is another sectional view of the second preferred embodiment of the present invention in which the lock core is located at a second position.

The second preferred embodiment of the present invention is Shown in FIGS. 3, 4 and 5 and is provided with a second lock core 50 capable of activating the alarm device 26. The second lock core 50 comprises a second body portion 51, a second lock bolt 52, a second retrieving spring 53, a second retaining portion 54, a second retaining member 55, and a second driving portion 57. The second body portion 51 is movably disposed in the first axial hole 32. The second lock bolt 52 is extended leftwards from the left end of the second body portion 51 and can be actuated by the second body portion 51 to rotate or slide leftwards and rightwards. The second retrieving spring 53 is disposed between the seccond body portion 51 and the second axial hole 34. The second retaining portion 54 of a recessed construction is disposed in the periphery of the second lock bolt 52. The second retaining member 55 is fastened to the main body 22 such that the second retaining member 55 can be caused to move upwards and downwards, and that the second retaining member 55 is urged by a spring 56, and further that the second retaining member 55 is corresponding in location to the second retaining portion 54. The second driving portion 57 of an appropriate length is extended rightwards along the direction of the axis of the second lock bolt 52 from the left end of the second lock bolt 52. The second driving portion 57 is of a flat construction and is spaced at an appropriate distance from the second retaining portion 54. The distance between the second driving portion 57 and the axis of the second lock bolt 52 is smaller than the outer diameter of the second lock bolt 52.

As the second lock core 50 is urged to move leftwards, the end of the second lock bolt 52 is caused to move into the retaining hole 36 via the second axial hole 34 and the heat radiating hole 11 of the motorcycle disk brake 10. In the meantime, the second retaining member 55 is inserted into the second retaining portion 54 so as to retain the second lock bolt 52 by which the connection member 28 is pushed downwards to actuate the alarm device 26.

When the second lock core 50 is unlocked by a key to actuate the second lock bolt 52 to turn and to move rightwards, the second retaining member 54 is pushed upwards by the periphery of the second lock bolt 52. As a result, the second driving portion 57 is caused to turn downwards along with the second lock bolt 52 so as to force the connection member 28 to move upwards to shut off the alarm device 26.

What is claimed is:

1. An alarm lock comprising:

a main body;

a lock core comprising a body portion disposed in said main body such that said body portion can be caused to slide along the direction of an axis of said lock core, a lock bolt capable of being driven by said body portion, a retaining member on said body portion and a retaining portion on said main body corresponding to locate said lock core in a locked position, and a driving portion disposed on said lock bolt;

alarm means for sounding a speaker disposed in said main body; and switching means for actuating said alarm device disposed in said main body located between said driving portion and said alarm device, said switching means being actuated by said driving portion to switch said alarm device on or off;

wherein said main body has a slot dimensioned to receive therein a motorcycle disk brake, said main body further having a first axial hole, a second axial hole, and a third axial hole, with said first axial hole and said second axial hole being disposed coaxially in said main body such that said first axial hole and said second axial hole are in communication with said slot of said main body, and said third axial hole being disposed between said alarm means and said first axial hole and said second axial hole, said third axial hole further being so dimensioned as to receive therein said switching means, wherein said alarm device comprises a microswitch connected in a circuit including a first battery charger, a second battery charger, a triggering circuit, a comparing circuit, an oscillating circuit, and a loud speaker, said first battery charger and said second battery charger being actuated by said microswitch, said triggering circuit having a mercury switch and being activated by said first battery charger, said comparing circuit receiving a signal emitted respectively by said first battery charger and said triggering circuit and transmitting said signal to said oscillating circuit for actuating said loud speaker.

2. The alarm lock according to claim 1 wherein said microswitch is activated by said switching means.

3. The alarm lock according to claim 1 wherein said lock bolt is provided with a biasing means fitted over the circumference of said lock bolt for forcing said body portion of said lock core to move outwards.

4. The alarm lock according to claim 1 wherein said retaining portion is of a recessed construction and is located in an inner wall of said first axial hole; and wherein said retaining member is movable upward or downward on said body portion.

5. The alarm lock according to claim 1 wherein said retaining portion is an indentation in an outer surface of said lock bolt; and wherein said retaining member is spring biased upward or downward on said main body.

6. The alarm lock according to claim 1 wherein said lock bolt is of a rod-shaped construction and has a predetermined outer diameter; and wherein said driving portion is disposed on a first end of said lock bolt, with said first end of said lock bolt being adjacent to said body portion, said driving portion having at least a portion with an outer diameter greater than said outer diameter of said lock bolt.

7. The alarm lock according to claim 6 wherein said lock bolt is moved back and forth in the direction of an axis thereof along with said body portion.

8. The alarm lock according to claim 1 wherein said lock bolt is of a rod-shaped construction and has a predetermined outer diameter; and wherein said driving portion is disposed peripherally on said lock bolt such that said driving portion is extended axially for a predetermined length, said outer diameter of said lock bolt being greater than a distance between an axis of said lock bolt and a portion of said driving portion.

9. The alarm lock according to claim 1 wherein said lock bolt is driven to turn a predetermined angle along an axis thereof.

10. The alarm lock according to claim 1 wherein said switching means is of a rod-shaped construction and has a predetermined length, said switching means being urged constantly by a biasing means so as to press against an outer edge of said lock bolt.

* * * * *